US011572173B2

(12) United States Patent
Colmenares

(10) Patent No.: US 11,572,173 B2
(45) Date of Patent: Feb. 7, 2023

(54) AIRCRAFT CABIN SYSTEM CONTROL BY GESTURES WITHIN TASK ENVELOPES

(71) Applicant: Gulfstream Aerospace Corporation, Savannah, GA (US)

(72) Inventor: Simón Colmenares, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 2 days.

(21) Appl. No.: 17/302,706

(22) Filed: May 11, 2021

(65) Prior Publication Data
US 2022/0363393 A1 Nov. 17, 2022

(51) Int. Cl.
*G06F 3/01* (2006.01)
*B64D 11/00* (2006.01)
*G06F 3/04845* (2022.01)

(52) U.S. Cl.
CPC .......... *B64D 11/0015* (2013.01); *G06F 3/017* (2013.01); *B64D 2011/0053* (2013.01); *G06F 3/04845* (2013.01)

(58) Field of Classification Search
None
See application file for complete search history.

(56) References Cited

U.S. PATENT DOCUMENTS

| 2014/0358332 A1* | 12/2014 | Colmenares | ......... B64C 13/044 701/3 |
| 2015/0022316 A1* | 1/2015 | Dixon | ................. G08B 25/008 340/5.51 |
| 2019/0302895 A1* | 10/2019 | Jiang | ...................... G06F 3/016 |

* cited by examiner

*Primary Examiner* — Rinna Yi
(74) *Attorney, Agent, or Firm* — LKGlobal | Lorenz & Kopf, LLP

(57) ABSTRACT

A control system for an aircraft cabin includes a first sensor, a second sensor, and a processor. The first and second sensors are configured to detect communicative gestures of a subject and are oriented to detect the communicative gestures in first and second cabin volumes, respectively. The second cabin volume at least partially overlaps the first cabin volume. The processor is configured to: identify a control volume defined by an overlap between the first and second cabin volumes; define a task envelope as a sub-set of the control volume in which the subject may perform the communicative gestures; disregard communicative gestures outside of the task envelope; compare an identified gesture of the communicative gestures performed inside the task envelope with a plurality of stored gestures; and generate a control task to command cabin devices in response to a match between the identified gesture one of the stored gestures.

18 Claims, 3 Drawing Sheets

AIRCRAFT CABIN SYSTEM CONTROL BY GESTURES WITHIN TASK ENVELOPES

TECHNICAL FIELD

The technical field relates generally to aircraft cabin control systems, and more particularly relates to aircraft cabin control systems with control volumes defined by overlapping sensor detection volumes.

BACKGROUND

As modern aviation advances, the demand for ever-increasing passenger flight comfort and entertainment systems features and performance grows. To help meet this demand, modern aircraft include impressive arrays of devices (gadgets, ultra-high definition monitors, premium sound systems, high-speed data services, and other instruments and sensors) designed to provide the passengers with access and control of such devices via buttons and levers, touchscreens with menus, remote controls, and other options intended to enhance the passenger experience in the cabin without compromising comfort or entertainment value.

A typical aircraft cabin system includes control devices with knobs, buttons, or touchscreens with soft-buttons and menus, remote controls and touch pads. These control devices control lights, monitors, window shades, entertainment equipment, etc. The devices are often implemented on a cluster conspicuously located close to the equipment under control, or strategically located in an area of the cabin with common access to crew and passengers.

Passenger and crew cabin systems, including in-flight entertainment (IFE) systems are becoming more sophisticated, more complex, and more integrated. This level of sophistication and integration comes at the high price of adding ever more control devices, with more features, and with systems that are physically laid out across the cabin in the form of buttons, control panels, control touchscreens, wireless remote controls, and other such devices. The economic impact of all these added devices can be summarized in added carry-on weight and added costs of ownership (acquisition, operation and maintenance). While these control devices in current aircraft are adequate, there is room for improvement.

Accordingly, it is desirable to provide a control system for aircraft cabins with beneficial ease of use, cost, and weight characteristics. Furthermore, other desirable features and characteristics of the present invention will become apparent from the subsequent detailed description of the invention and the appended claims, taken in conjunction with the accompanying drawings and this background of the invention.

SUMMARY OF EMBODIMENTS

Various non-limiting embodiments of a control system and an aircraft are disclosed herein.

In a first non-limiting embodiment, a control system for an aircraft cabin includes a first sensor, a second sensor, and a processor. The first sensor is configured to detect communicative gestures of a subject and is oriented to detect the communicative gestures in a first cabin volume. The second sensor is configured to detect the communicative gestures and is oriented to detect the communicative gestures in a second cabin volume that at least partially overlaps the first cabin volume. The processor is communicatively coupled with the first sensor and the second sensor. The processor is configured to: identify a control volume defined by an overlap between the first cabin volume and the second cabin volume; define a task envelope as a sub-set of the control volume in which the subject may perform the communicative gestures; disregard communicative gestures outside of the task envelope; compare an identified gesture of the communicative gestures performed inside the task envelope with a plurality of stored gestures; and generate a control task to command cabin devices in response to a match between the communicative gestures performed inside the task envelope and a stored gesture of the plurality of stored gestures.

In a second non-limiting embodiment, an aircraft includes an aircraft cabin, a plurality of cabin devices, and a control system. The aircraft cabin is for occupancy by a subject. The aircraft cabin has a first cabin volume and a second cabin volume that at least partially overlaps the first cabin volume. The plurality of cabin devices are disposed within the aircraft cabin and are controlled electronically. The control system is communicatively coupled with the plurality of cabin devices for electronic control. The control system includes a first sensor, a second sensor, and a processor. The first sensor is configured to detect communicative gestures of the subject and is oriented to detect the communicative gestures in the first cabin volume. The second sensor is configured to detect the communicative gestures and is oriented to detect the communicative gestures in the second cabin volume. The processor is communicatively coupled with the first sensor and the second sensor. The processor is configured to: identify a control volume defined by an overlap between the first cabin volume and the second cabin volume; define a task envelope as a sub-set of the control volume in which the subject may perform the communicative gestures; disregard communicative gestures outside of the task envelope; compare an identified gesture of the communicative gestures performed inside the task envelope with a plurality of stored gestures; and generate a control task to command the plurality of cabin devices in response to a match between the identified gesture and a stored gesture of the plurality of stored gestures.

BRIEF DESCRIPTION OF THE DRAWINGS

Advantages of the present disclosure will be readily appreciated, as the same becomes better understood by reference to the following detailed description when considered in connection with the accompanying drawings wherein.

DETAILED DESCRIPTION

Figure 1:
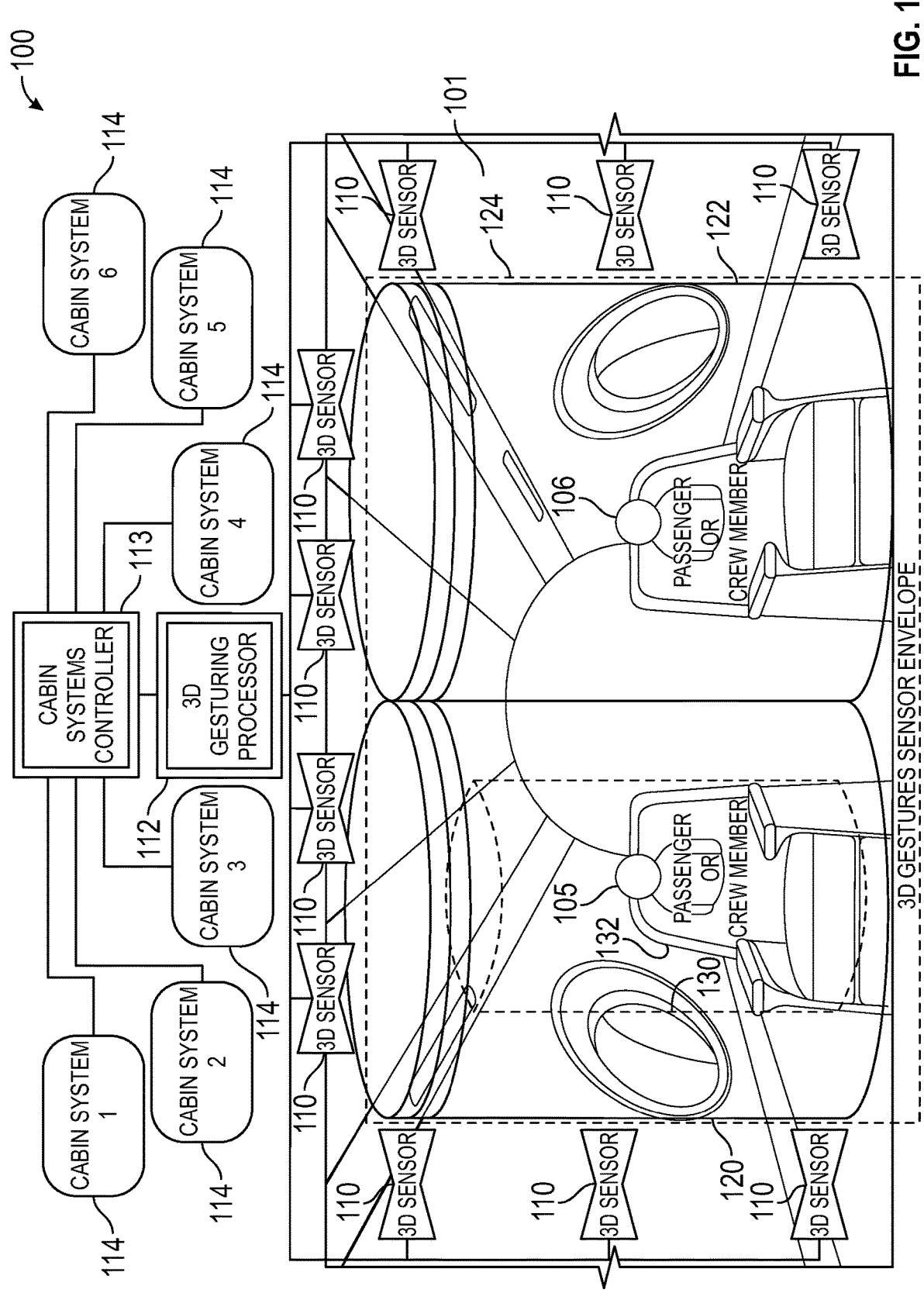
FIG. 1 is a simplified diagram of an aircraft cabin control system with a plurality of virtual three-dimensional control envelopes in accordance with some embodiments.

The following detailed description is merely exemplary in nature and is not intended to limit application and uses. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the disclosed embodiments and not to limit the scope of the disclosure which is defined by the claims. Furthermore, there is no intention to be bound by any expressed or implied theory presented in the preceding technical field, background, brief summary, the following detailed description or for any particular computer system.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Finally, for the sake of brevity, conventional techniques and components related to computer systems and other functional aspects of a computer system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

In some embodiments, an aircraft includes several sensors configured to detect a gesture in three dimensions. The sensors create a virtual three-dimensional task envelope in a volume proximate the sensors in which to detect the gestures. For example, the volume for the task envelope may be located in a cabin of the aircraft. The sensors are configured to detect specific arm/hand/finger movements (gestures) and provide an output to a processor. The processor interprets the output of the sensors and generates control commands for the cabin systems controller.

The embodiments described herein facilitate ease of interfacing and controlling aircraft cabin system equipment by providing passengers and crew members a simple way to use touchless gestures. For example, the gestures may include movement of fingers, hands, arms, and/or other body parts without physical touch or close proximity to the cabin system being controlled. The cabin systems may include window shades, entertainment systems, monitors, sound equipment, cabin lights, pocket doors, and other cabin devices.

Some embodiments create a virtual three-dimensional control envelope by defining a volumetric control space that can collate a plurality of 3D gesturing sensors. One or several volumetric control spaces can be defined in an aircraft cabin. The 3D sensors detect specific finger(s)/hand(s)/arm(s)/body movements (gestures) and provide that data to a processor that interprets and generates control commands to the cabin control system. These commands would therefore be acted upon accordingly by the cabin control system.

In contrast with traditional touchless control systems that have a fixed-view cone or area where users need to stay in the active cone or area to assert control, the embodiments described herein allow natural movement by the user. Additionally, the spatial nature of the system allows for a tailored response by the system, such that any gesture command detected by it can be handled for the specific user (i.e., their light, their shade, a movie, etc.)

In some embodiments, the systems are independent of the 3D gesturing sensing technology, and are independent of the cabin systems control technology or application implementation. Sensor redundancy can be applied in the layout to increase function availability, operability, and system reliability.

Referring now to FIG. 1, an example of a cabin control system 100 for an aircraft cabin 101 for use by a subject 105 is illustrated in accordance with some embodiments. The subject 105 may be a crew member or a passenger located in the cabin 101.

The cabin control system 100 includes a plurality of sensors 110, a sensor processor 112, a cabin controller 113, and at least one controllable cabin system 114. In the illustrated embodiment, the sensors 110 and the controllable cabin system 114 are each communicatively coupled with the cabin controller 113. Such communicative coupling may be achieved by any suitable method, including, but not limited to, either or both wired coupling and wireless coupling. In some embodiments, a single sensor 110 and/or multiple sensor processors 112 are utilized.

The sensors 110 are configured to detect movement and communicative gestures of the subject 105 within individual sensor detection cabin volumes (not numbered). The individual sensor detection cabin volumes collectively cover substantially an entire interior cabin volume 124 of the aircraft cabin 101. As used herein, the term "substantially covers an entire interior volume" means that the sensors 110 cover volumes that include all areas where a designer of cabin 101 expects or intends subject 105 to be located or to occupy. For example, the subject 105 is not expected to be located in crevices, small corners, or closed drawers of the cabin 101, and such crevices or small corners may be omitted from coverage while still maintaining coverage for substantially the entire interior cabin volume 124 of the cabin 101.

The individual sensor coverage volumes overlap with at least one other of the individual sensor coverage volumes to define control volumes 120 and 122 in which the sensor processor 112 may look for communicative gestures from the subject 105 to control the cabin systems 114. In the example provided, the control volumes collectively cover substantially the entire cabin volume 124. Within the control volumes 120 and 122, the sensor processor 112 defines task envelopes based on the location of the subject 105, as will be discussed below.

The sensors 110 may be mounted to a ceiling of the aircraft, to a panel in the cabin, to an inside wall of the aircraft, or any other suitable location to provide three-dimensional sensing within the control volumes 120, 122. In some embodiments, the sensors are mounted so that the entire cabin volume 124 and the control volumes 120, 122 are entirely collocated to detect movement within the entire volume of the cabin.

The sensors 110 may incorporate any suitable technology, such as optical, ultrasound, infrared, radar, and capacitive technologies. In some embodiments, the sensors 110 are ultrasonic touchless sensors that transmit signals and detect reflections or echoes with micro-electro-mechanical microphones. Providing multiple ultrasonic sensors reduces obstruction of far objects by objects closer to any given sensor. Ultrasonic sensors advantageously provide accurate gesture detection over a large volume with low power consumption.

In some embodiments, the sensors 110 may include a camera, depth sensor, and multi-array microphone. In some embodiments, the sensors 110 are two dimensional optical cameras, and the sensor processor 112 is configured to determine the third dimension of the gestures.

The sensor processor 112 and the cabin controller 113 may include any combination of software and hardware. For example, the sensor processor 112 and the cabin controller 113 may include an application specific integrated circuit (ASIC), an electronic circuit, a processor (shared, dedicated, or group) and memory that execute one or more software or firmware programs, a combinational logic circuit, and/or other suitable components that provide the described functionality. The sensor processor 112 and the cabin controller 113 may have the same hardware configuration or may have different hardware configurations. In some embodiments, the sensor processor 112 and the cabin controller 113 are combined.

The sensor processor 112 receives signals generated by the sensors 110 and identifies gestures within the control volumes 120, 122. The sensor processor 112 is further configured to define a task envelope 130 based on a location of the subject 105. In some embodiments, the sensor processor 112 determines the location of the subject 105 based on a predefined location corresponding to an expected location of the subject. For example, the sensor processor 112 may be configured by the aircraft cabin finisher to define the task envelope 130 at a seat 132 in the cabin 101. In some embodiments, the sensor processor 112 is further configured to adjust a size of the task envelope 130 based on the location of the subject 105 and a predefined relationship between the location of the subject 105 and the size of the task envelope 130. For example, the location at the seat 132 may correspond to a task envelope 130 size set to detect communicative gestures of large and small humans in a seated position in seat 132. In some embodiments, the task envelope 130 is a three-dimensional space that surrounds the cabin seat 132 or other specific subject-occupied space of the aircraft cabin 101. Accordingly, movement and gestures by the subject 105 may be detected by the sensors 110 and analyzed by the sensor processor 112.

In some embodiments, the sensor processor 112 is further configured to determine the location of the subject 105 based on input from the sensors 110. For example, sensor processor 112 may be configured to detect the location and size of subject 105 and to define the task envelope 130 based on the detected location and size. When detection over the entire interior cabin volume 124 is utilized, the sensor processor 112 may be configured to filter out movements or commands based on a set of rules that define the task envelope 130. The rules may define a set volume, such as the task envelope 130 or may define volumes relative to variables such as the locations of authorized crew members within the aircraft. In some embodiments, the rules may define what stored gestures are recognized by a particular subject based on authentication of the subject, such as by facial recognition techniques.

The task envelope 130 may be any suitable shape or size and each at least partially overlaps an expected area of movement. In some embodiments, the task envelope 130 may surround other subjects of the aircraft or may be configured to have adjustable size and location based on a current location of a subject. For example, the task envelope may be configured based on subject preferences even when the subject is seated in another seat. In some embodiments, the subject 105 may move about the cabin 101 with the task envelope 130 following the subject. In some embodiments, the subject 105 may adjust the size and location of the task envelope 130 to detect gestures by a particular arm or hand of the subject 105 while disregarding gestures by the other arm or hand of another subject.

In the example illustrated, movement within the control volume 120 is detected with a first group of four sensors 110 and movement within the second control volume 122 is detected with a second group of four sensors 110. It should be appreciated that in other embodiments, a greater number of sensors or a smaller number of sensors may be utilized to detect gestures and movement within the control volumes 120, 122 without departing from the scope of the present disclosure.

The gestures may include any gesture involving movement of body parts (e.g., arms, legs, feet, heads, hands, fingers), movement of held objects, or movement of objects worn by a subject (e.g., an armband, watch, bracelet, ring, etc). For example, the subject may raise or lower an arm, open or close a hand, or point and bend a finger to move a cursor displayed on the cabin system (i.e., monitor) 114 or select objects located under the cursor. Similarly, the gestures may be directly associated with particular tasks that are generated without use of the cursor. In some embodiments, the sensor processor 112 may only generate tasks based on gestures in which the subject is holding a control object to reduce unintended control of the cabin systems. In other embodiments, the sensor processor 112 does not generate tasks until a specific gesture indicates that gesture control is desired.

The sensor processor 112 or cabin controller 113 may compare the detected motion with a gesture library associated with the sensor processor 112. In some embodiments, each subject may customize the gestures that are associated with tasks within the task envelope associated with each subject. For example, one subject may customize the gestures to increase a size of a displayed map on a cabin monitor when the subject separates two fingers, while a different subject may increase a size of the displayed map on a cabin monitor with an open palm moving away from the display. It should be appreciated that the actual gestures incorporated may be different from the examples described herein without departing from the scope of the present disclosure.

In some embodiments, the sensor processor 112 generates tasks only when two unique gestures are recognized within a specified amount of time. A confirmation gesture may be unique to the task requested or may be generic to all tasks. In some embodiments, a complex confirmation gesture is required to generate tasks related to cabin components like display monitors and a simple confirmation gesture is required to generate tasks related to cabin components like window shades.

In some embodiments, the generated tasks include altering image formats on the cabin display monitors as the cabin system 114 and manipulating equipment in the aircraft (i.e., external or internal cameras video, moving map, etc.). Examples of altering the image formats include changing the size of displayed content, the location of displayed content on the displays, and navigating through menus. For example, when the processor detects a specific gesture by the subject, the sensor processor 112 may generate a task to increase the size of a map presented on the display. Other gestures may be incorporated based on the desired manipulation of displayed content. The display monitors may therefore be customized and controlled in an intuitive and simple manner.

Manipulating cabin equipment may include complex gestures requiring multiple arms or multiple pilots. The complexity of the gesture may be based on which cabin component is to be manipulated. For example, complex gestures may be used to manipulate cabin lights, sound system, or bulkhead doors. It should be appreciated that any additional or alternative tasks associated with conventional cursor control devices may be generated by the sensor processor 112 based on the signals generated by the sensors 110 without departing from the scope of the present disclosure.

The display monitor of a cabin system 114 may be any type of display, such as a projection screen, an illuminated gauge, an LED readout, or an LCD monitor. In some embodiments, the display is an optical surface that does not include sensing capability. For example, separate gesture sensing may permit utilization of a less expensive and lighter weight alternative to conventional touch screens monitors that have embedded touch sensors. Furthermore, lighter weight and less cluttered aircraft cabins may be designed when compared with designs that incorporate knob, button, and lever-based consoles, panels and ledges.

Figure 2:
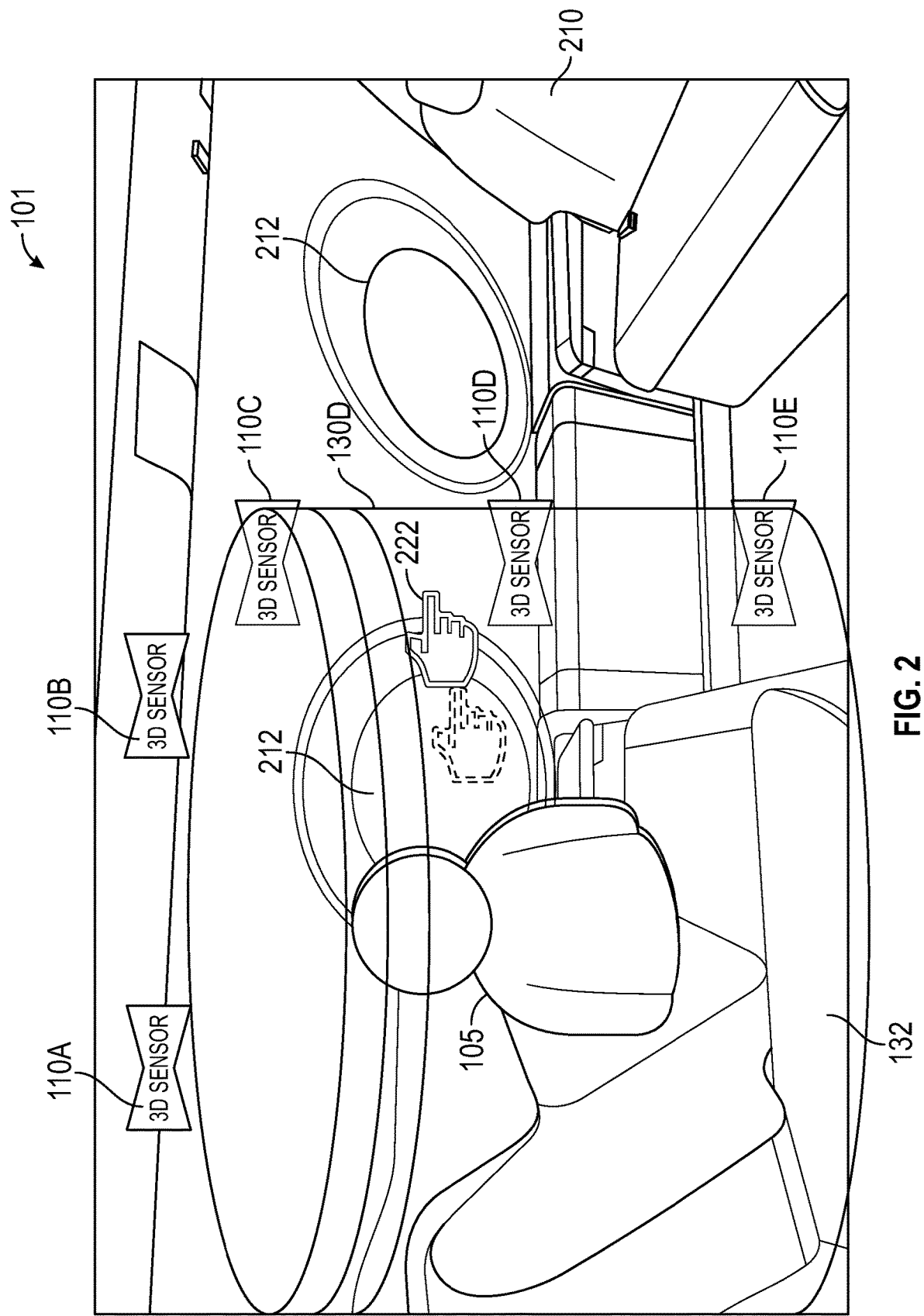
FIG. 2 is a simplified side view of an aircraft cabin with the control envelope of FIG. 1 in accordance with some embodiments.

Referring now to FIG. 2, a side view of the cabin 101 is illustrated in accordance with some embodiments. The cabin 101 includes the seat 132, a divan 210, a plurality of windows 212, and various components of the cabin control system 100, where like numbers refer to like components. The seat 132 and the divan 210 may support any subject who has access to control any cabin system.

An example of a first object 220 and a second object 222 are illustrated in the task envelope 130. The objects 220, 222 may be hands, arms, control objects, pencils, or any other suitable object. Movement of the objects 220, 222 in any direction within the task envelope 130 is detected by at least one of the sensors and analyzed by the sensor processor 112, as discussed above.

A first group of sensors includes sensors 110A and 110B that are mounted to the ceiling facing down at the subject 105, seat 132, and the floor. A second group of sensors includes sensors 110C and 110D that are mounted to the upper and middle sections of the side panel of the cabin facing inwards towards the subject 105 and seat 132. A third sensor 110E is mounted to the ledge panel adjacent to the seat 132 and facing inwards towards the subject 105 and seat 132. The sensors 110A-E are configured to detect three dimensions of gestures or movements within the task envelope 130. In some embodiments, a sensor is mounted to a floor surface to detect foot and/or leg movements of the subject.

In some embodiments, the sensors 110A-E provide sensing over separate portions of the task envelope 130. In some embodiments the sensors 110A-E each provide sensing over the entire volume of the task envelope 130 and/or the control volume 120 for redundancy and reduction of sensor obstruction. Such sensor redundancy may be incorporated to increase availability and reliability of the sensing capabilities of the cabin control system 100.

Figure 3:
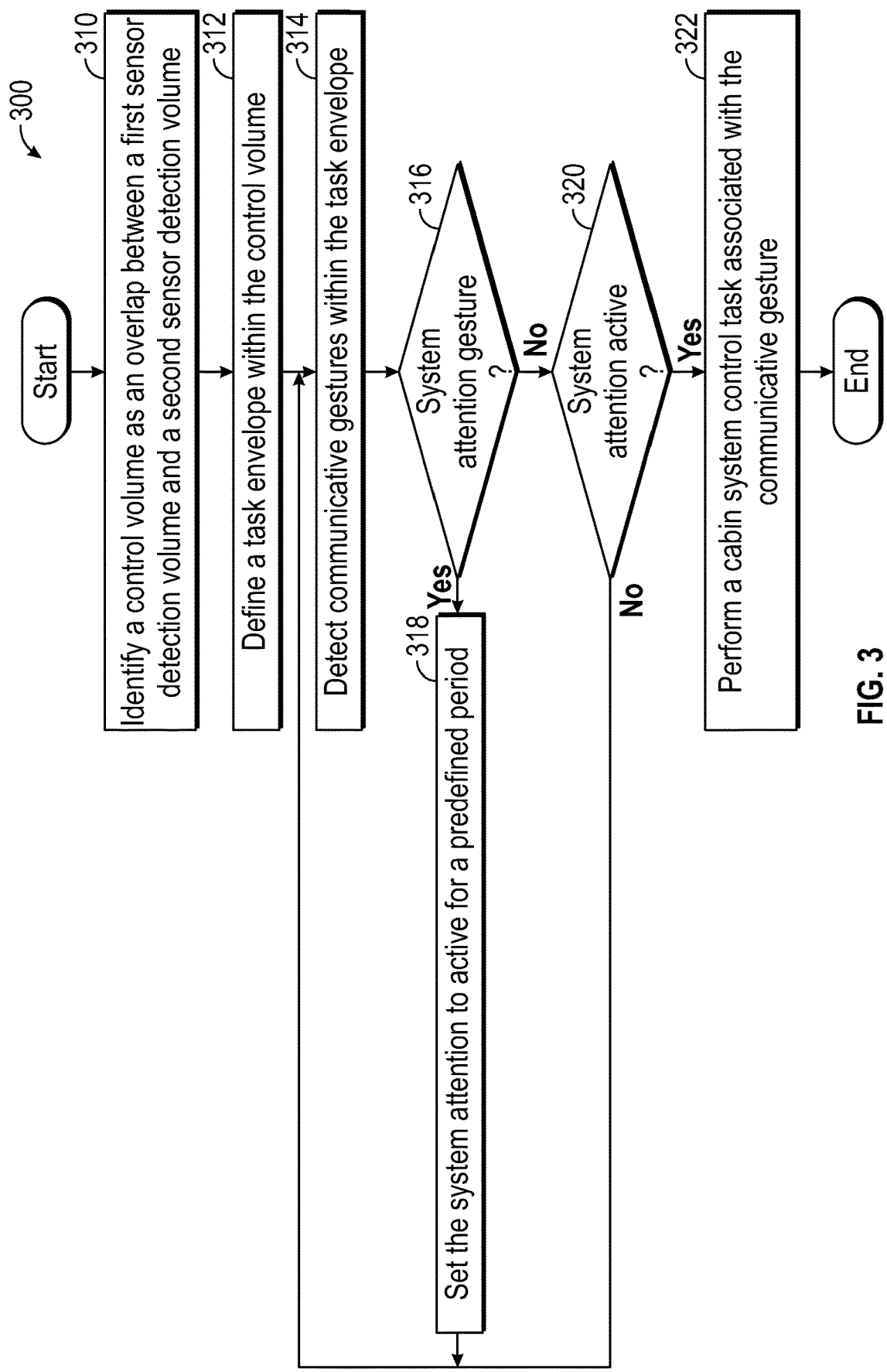
FIG. 3 is a flow diagram of a method for operating an aircraft cabin control system in accordance with some embodiments.

Referring now to FIG. 3, a flow diagram of a method 300 for operating a cabin control system in an aircraft is illustrated in accordance with some embodiments.

Task 310 identifies a control volume as an overlap between a first sensor detection volume and a second sensor detection volume. For example, the sensor processor 112 may identify control volume 120.

Task 312 defines a task envelope within the control volume. For example, the sensor processor 112 may identify the task envelope 130.

Task 314 detects communicative gestures within the task envelope. For example, the sensor processor 112 may monitor output from the sensors 110A-E mounted to the ceiling and the side panels of the cabin 101. In some embodiments, the sensor processor 112 verifies the sensor by comparing data obtained from two separate sensors for consistency. In some embodiments, verification is omitted.

Sensor processor 112 compares identified gestures of the communicative gestures performed inside the task envelope with a plurality of stored gestures and disregards communicative gestures performed outside of the task envelope.

Task 316 determines whether the identified gesture is a system attention gesture of the plurality of stored gestures. For example, the system attention gesture may be a specific movement performed to indicate that subsequent gestures are cabin control gestures to limit unintentional system control. In some embodiments, the system attention gesture is omitted.

When the identified gesture is a system attention gesture, the method 300 proceeds to task 318. Task 318 activates gesturing control for a predetermined time. For example, the sensor processor 112 may indicate to the cabin controller 113 that the system should be active for one minute. It should be appreciated that other predefined periods of time may be utilized without departing from the scope of the present disclosure.

When the identified gesture is not a system attention gesture, the method 300 proceeds to task 320. Task 320 determines whether system attention is active for gesturing control. For example, the sensor processor 112 may disregard movements until an activation device (e.g., a button, switch, touchscreen press, etc.) is actuated or an activation gesture is performed.

In some embodiments, the sensor processor 112 turns off or reduces power to the sensors 110 to conserve energy when system attention is not active. When gesture control is not active, the gesturing processor continues to monitor the sensors until gesture control is active.

When the system attention is not active, the method 300 returns to task 314 and the sensor processor disregards the identified gesture. For example, where an attention gesture is used, the sensor processor 112 may disregard the identified gesture in response to determining that the identified gesture is not the system attention gesture and that the system attention gesture was not previously identified within a predetermined amount of time.

When the system attention is active for gesture control, method 300 proceeds to task 322. Task 322 compares the sensor data with stored gestures to identify a cabin system to control. For example, the sensor processor 112 may compare data from the sensors 110 with a database or library of gestures associated with the sensor processor 112. When the sensor data does not match a known gesture, the gesturing processor continues monitoring the sensors.

When the sensor data indicates a cabin system command gesture, the sensor processor 112 commands the cabin controller 113 to control the cabin system 114 or device. The generated tasks may further relate to any task associated with a cabin system control command or with a traditional control device in an aircraft cabin. As discussed above, the control task may be related to control of the cabin display monitors or manipulation of another cabin equipment as the cabin system 114.

The embodiments provided herein provide numerous advantages over prior systems. Traditional touchless control systems have a fixed-view cone or area, and users need to stay in the active cone or area to assert control. The embodiments described herein do not have a fixed-view cone or area and allow for natural movement by the user. The embodiments provided are also independent of the sensor technology, as well as it is independent of the cabin systems control technology or application implementation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control system for an aircraft cabin, the control system comprising:
    a first sensor configured to detect communicative gestures of a subject and oriented to detect the communicative gestures in a first cabin volume;
    a second sensor configured to detect the communicative gestures and oriented to detect the communicative gestures in a second cabin volume that at least partially overlaps the first cabin volume; and
    a processor communicatively coupled with the first sensor and the second sensor, the processor configured to:
        identify a control volume defined by an overlap between the first cabin volume and the second cabin volume;
        define a task envelope as a sub-set of the control volume in which the subject may perform the communicative gestures;
        disregard communicative gestures outside of the task envelope;
        compare an identified initial gesture of the communicative gestures performed inside the task envelope with a plurality of stored gestures;
        determine whether the identified initial gesture is a system attention gesture of the plurality of stored gestures;
        disregard the identified initial gesture in response to determining that the identified initial gesture is not the system attention gesture;
        activate gesturing control for a predetermined amount of time in response to determining that the identified initial gesture is the system attention gesture;
        while gesturing control is active during the predetermined amount of time, comparing at least one identified command gesture of the communicative gestures performed inside the task envelope with the plurality of stored gestures; and
        generate a control task to command one or more cabin devices in response to a match between the at least one identified command gesture and at least one stored gesture of the plurality of stored gestures.

2. The control system of claim 1, wherein the processor defines the task envelope based on a location of the subject performing the communicative gestures.

3. The control system of claim 2, wherein the processor is further configured to determine the location of the subject based on a predefined location corresponding to an expected location of the subject.

4. The control system of claim 2, wherein the processor is further configured to determine the location of the subject based on input from at least one of the first sensor and the second sensor.

5. The control system of claim 4, wherein the processor is further configured to adjust a size of the task envelope based on the location of the subject and a predefined relationship between the location of the subject and the size of the task envelope.

6. The control system of claim 1, wherein each of the first sensor and the second sensor is one of an optical sensor, an ultrasonic sensor, an infrared sensor, and a capacitive sensor.

7. The control system of claim 1, wherein the first sensor is configured to be mounted to an internal surface within the aircraft cabin.

8. The control system of claim 7, further comprising a cabin monitor configured to display an image, and wherein the processor is further configured to generate the control task to change at least one of an image format, an image size, an image location, and a menu presentation of the image.

9. The control system of claim 7, wherein the processor is further configured to generate the control task to command at least one of a window shade, a light dimmer, and a climate control system.

10. The control system of claim 1, wherein the processor is further configured to identify a control object wielded by the subject and to determine that the identified initial gesture is the system attention gesture based on identification of the control object to reduce unintended control of the cabin devices.

11. The control system of claim 1, wherein the processor is further configured to determine whether the identified initial gesture is a cabin device control gesture and to disregard the cabin device control gesture in response to determining that the subject has not previously performed the system attention gesture within the predetermined amount of time.

12. The control system of claim 1, wherein a complexity of the plurality of stored gestures is based on a type of task to be performed on the cabin devices.

13. The control system of claim 1, wherein the first sensor and the second sensor are part of a plurality of sensors that detect movement in a plurality of cabin volumes, and wherein the plurality of sensors are disposed such that each of the plurality of cabin volumes overlaps at least one other of the plurality of cabin volumes to define the control volume that covers substantially an entire interior volume of the aircraft cabin.

14. The control system of claim 1, wherein the processor is further configured to verify identified gestures by comparing sensor inputs from the first sensor and the second sensor.

15. An aircraft, comprising:
    an aircraft cabin for occupancy by a subject, the aircraft cabin having a first cabin volume and a second cabin volume that at least partially overlaps the first cabin volume;
    a plurality of cabin devices disposed within the aircraft cabin and that are controlled electronically; and
    a control system communicatively coupled with the plurality of cabin devices for electronic control, the control system comprising:
        a first sensor configured to detect communicative gestures of the subject and oriented to detect the communicative gestures in the first cabin volume;
        a second sensor configured to detect the communicative gestures and oriented to detect the communicative gestures in the second cabin volume; and
        a processor communicatively coupled with the first sensor and the second sensor, the processor configured to:

identify a control volume defined by an overlap between the first cabin volume and the second cabin volume;

define a task envelope as a sub-set of the control volume in which the subject may perform the communicative gestures;

disregard communicative gestures outside of the task envelope;

compare an identified initial gesture of the communicative gestures performed inside the task envelope with a plurality of stored gestures;

determine whether the identified initial gesture is a system attention gesture of the plurality of stored gestures;

disregard the identified initial gesture in response to determining that the identified initial gesture is not the system attention gesture;

activate gesturing control for a predetermined amount of time in response to determining that the identified initial gesture is the system attention gesture;

while gesturing control is active during the predetermined amount of time, comparing at least one identified command gesture of the communicative gestures performed inside the task envelope with the plurality of stored gestures; and generate a control task to command one or more of the cabin devices in response to a match between the at least one identified command gesture and at least one stored gesture of the plurality of stored gestures.

16. The aircraft of claim 15, wherein the processor defines the task envelope based on a location of the subject performing the communicative gestures.

17. The aircraft of claim 15, wherein the first sensor is configured to be mounted to an internal surface within the aircraft cabin.

18. The aircraft of claim 15, wherein the processor is further configured to verify identified gestures by comparing sensor inputs from the first sensor and the second sensor.

* * * * *